United States Patent
Gorman et al.

(10) Patent No.: US 8,407,521 B2
(45) Date of Patent: Mar. 26, 2013

(54) DYNAMIC TESTING OF NETWORKS

(75) Inventors: Bradley M. Gorman, Perth (AU); Luke R. McKenna, Bentley (AU); Peter G. Woodward, Perth (AU)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 12/351,196

(22) Filed: Jan. 9, 2009

(65) Prior Publication Data

US 2010/0180155 A1 Jul. 15, 2010

(51) Int. Cl.
G06F 11/00 (2006.01)

(52) U.S. Cl. .......................................... 714/27; 714/43

(58) Field of Classification Search .................. 714/27, 714/26, 4, 43, 4.1; 709/224; 370/242–245
See application file for complete search history.

(56) References Cited

U.S. PATENT DOCUMENTS

| | | | | |
|---|---|---|---|---|
| 6,269,330 B1 * | 7/2001 | Cidon et al. | | 714/43 |
| 6,892,328 B2 * | 5/2005 | Klein et al. | | 714/42 |
| 7,274,670 B2 * | 9/2007 | Hicks et al. | | 370/252 |
| 7,379,461 B2 | 5/2008 | Wu et al. | | |
| 7,983,175 B2 * | 7/2011 | Gale et al. | | 370/242 |
| 2002/0169819 A1 * | 11/2002 | Nguyen et al. | | 709/202 |
| 2007/0011484 A1 * | 1/2007 | Chriss et al. | | 714/4 |
| 2007/0041554 A1 * | 2/2007 | Newman et al. | | 379/218.01 |
| 2007/0177615 A1 * | 8/2007 | Miliefsky | | 370/401 |
| 2007/0260927 A1 * | 11/2007 | Smith et al. | | 714/37 |
| 2008/0049648 A1 | 2/2008 | Liu et al. | | |
| 2008/0256389 A1 * | 10/2008 | Neethiraj et al. | | 714/27 |
| 2010/0149994 A1 * | 6/2010 | Qian et al. | | 370/242 |

* cited by examiner

Primary Examiner — Scott Baderman
Assistant Examiner — Joseph Kudirka
(74) Attorney, Agent, or Firm — DeLizio Gilliam, PLLC

(57) ABSTRACT

Service providers strive to maintain networks with high levels of availability and performance. To maintain the networks, the service providers measure performance and perform network diagnostics. Measuring performance and performing network diagnostics typically involves manual verification of functionality or performing individual tests between user agents. Service providers who maintain networks and service providers who use networks can dynamically run tests with operations of a signaling protocol (e.g., session initiation protocol) to diagnose network problems and determine appropriate responses. An agent manager can coordinate the dynamic tests across multiple user agents to gather more information to increase problem diagnosis accuracy.

20 Claims, 5 Drawing Sheets

DYNAMIC TESTING OF NETWORKS

BACKGROUND

Embodiments of the inventive subject matter generally relate to the field of networking, and, more particularly, to dynamic testing of networks.

The session initiation protocol (SIP) is a protocol used for setting up and tearing down multimedia communications sessions for voice and video calls over the Internet. Examples of other applications of SIP include streaming multimedia distribution, instant messaging and online gaming. A SIP network comprises a plurality of user agents connected to one or more SIP servers. Each user agent is an end-user device and is capable of acting as a user agent client and a user agent server. In addition, one user agent may act as multiple user agent clients and/or user agent servers.

SUMMARY

Embodiments include a method directed to an agent manager transmitting a first set of one or more network commands to a plurality of user agents across a network to test the network. The plurality of user agents execute respective ones of the first set of network commands to generate a first set of results. The first set of results received from the plurality of user agents is analyzed. A second set of one or more commands to be issued to the plurality of user agents is automatically determined based on the first set of test results. The second set of commands is transmitted to at least one of the plurality of user agents, wherein the at least one of the plurality of user agents executes respective ones of the second set of commands to generate a second set of results. A problem in the network is diagnosed based on the first and the second set of results. An indication of the diagnosed problem is stored in a machine-readable medium.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Service providers strive to maintain networks with high levels of availability and performance. To maintain the network, the service providers measure performance and perform network diagnostics. Measuring performance and performing network diagnostics typically involves manual verification of functionality or performing individual tests between user agents. Service providers who maintain networks and service providers who use networks can dynamically run tests with operations of a signaling protocol (e.g., session initiation protocol) to diagnose network problems and determine appropriate responses. An agent manager can coordinate the dynamic tests across multiple user agents to gather more information to increase problem diagnosis accuracy.

Figure 1:
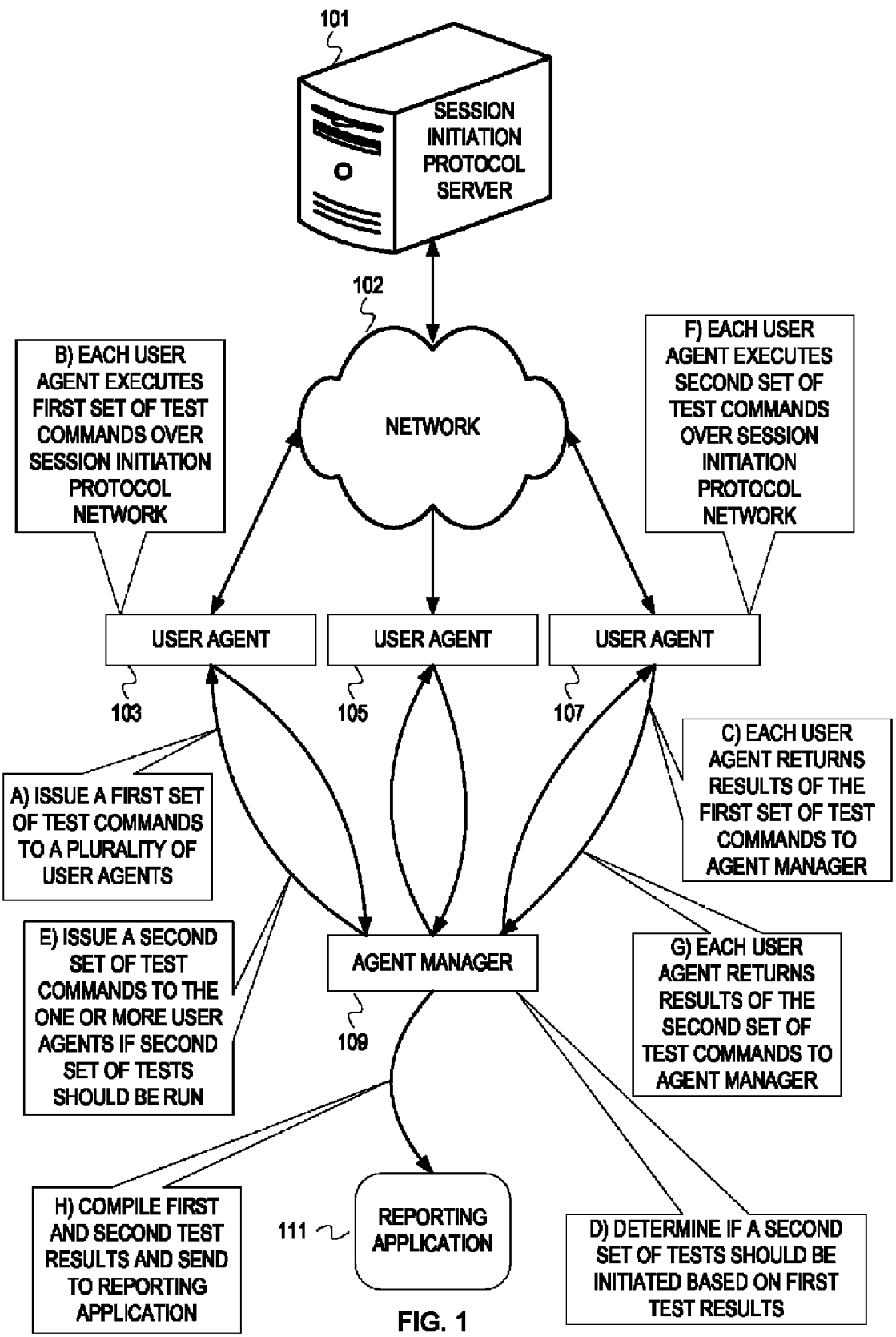
FIG. 1 depicts an example conceptual diagram of coordinating user agents to run dynamic tests in a session initiation protocol network.

FIG. 1 depicts an example conceptual diagram of coordinating user agents to run dynamic tests in a network. Three user agents 103, 105 and 107 are in communication with a SIP server 101 via network 102. An agent manager 109 coordinates the three user agents 103, 105 and 107.

At stage A, the agent manager 109 issues a first set commands for network diagnostics ("test commands") to the plurality of user agents 103, 105, and 107. The test commands can be SIP or other signaling protocol commands that are issued by the agent manager 109 to perform network diagnostics rather than establishing sessions for communications. Note that a user agent may participate in a communications session along with performing test commands. Examples of test commands include register user agent with a SIP server, invite a first user agent to a session by a second user agent, etc. The test commands issued to each user agent 103, 105 and 107 may be identical. For example, the agent manager 109 may issue commands to user agent 103 and 105 that comprise a command for the user agents 103 and 105 to register with a SIP server and a command for both user agents 103 and 105 to invite user agent 107 to a session. The test commands issued to each user agent 103, 105 and 107 may be different. For example, commands issued to user agent 107 may comprise register with a SIP server and terminate the sessions with user agents 103 and 105 after a specified period of time.

At stage B, each user agent 103, 105 and 107 executes the first set of test commands over the network 102. User agents 103, 105 and 107 may act as a user agent client or a user agent server depending on the test commands issued by the agent manager. A first user agent acts as a user agent client when it initiates requests to a second user agent. The second user agent acts as a user agent server because it responds to requests from the first user agent. The agent manager 109 can send test commands to all of the user agents 103, 105 and 107 or to a subset of the user agents 103, 105 and 107 by the agent manager 109.

At stage C, each user agent 103, 105 and 107 returns results of the first set of test commands to the agent manager 109. User agents 103, 105 and 107 may return test results for individual test commands or in bulk for a group of test commands.

At stage D, the agent manager 109 determines if a second set of one or more test commands should be issued based on the first test results. Some failures (e.g., expected responses are not received or not received within expected time frames) may have more than one cause, so additional testing may be performed to determine a specific cause for the failure. For example, the user agent 103 is unable to invite the user agent 107 to a session. Possible causes for this failure include the user agent 107 being down or not registered on the network, a connection break existing between the user agent 103 and the user agent 107, a network segment containing user agent 107 is down, etc. A second set of test commands can be used to determine a specific reason for the invitation failure. In addition, a second set of tests may be performed to determine network performance when the first test results indicate that all test commands were executed successfully.

At stage E, the agent manager 109 issues a second set of test commands to one or more of the user agents 103, 105 and 107. The agent manager 109 may or may not issue the second set of test commands to each user agent that participated in the first testing. For example, a registration command of the first set of test commands issued to user agent 103 results in a timeout error, but no other errors are reported in results of the first set of test commands. The agent manager 109 issues a test command in the second set of test commands to user agent 103 to retry the registration with a larger timeout window in a second set of test commands. However, test commands are not issued to user agents 105 and 107.

At stage F, each user agent 103, 105 and 107 executes the second set of test commands.

At stage G, each user agent 103, 105 and 107 returns results of the second set of test commands to the agent manager 109.

At stage H, the agent manager 109 processes the first and second test results and sends them to a reporting application. The agent manager 109 may determine that further tests should be performed. If further tests should be performed, the agent manager 109 repeats stages E-G. In addition, an agent manager may loop through stages D-G until achieving a terminating event or criteria (e.g., receiving particular results, reaching terminating number of execution cycles, etc.). Examples of reporting applications include an email application, a spreadsheet, a network event notification tool, etc. The test results sent to the reporting application include both pass and fail results. In some embodiments, test results may also include other information such as timing information.

Figure 2:
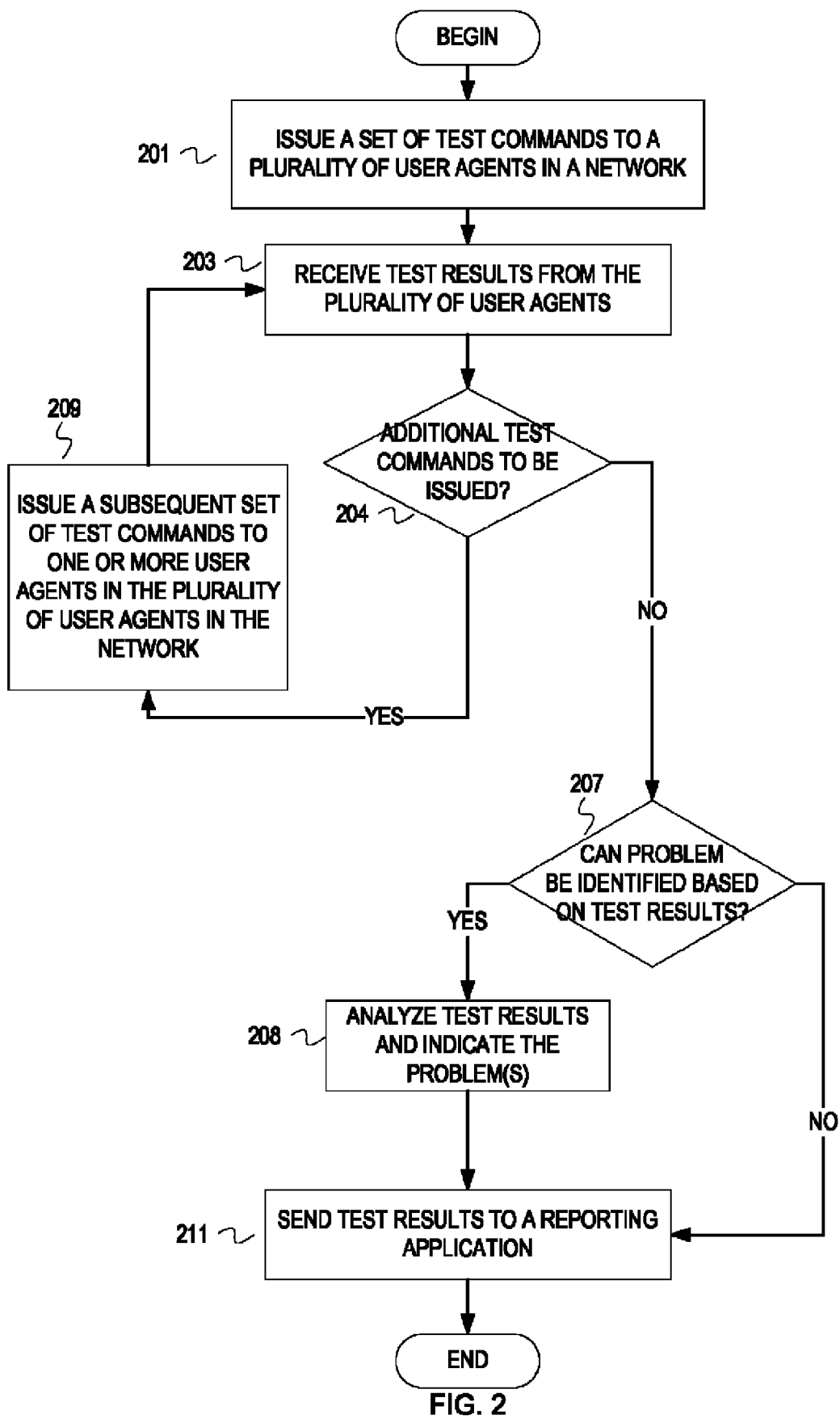
FIG. 2 is a flowchart depicting example operations for running dynamic tests in a session initiation protocol network.

FIG. 2 is a flowchart depicting example operations for running dynamic tests in a network. Flow begins at block 201, where an agent manager issues a set of test commands to a plurality of user agents in a network. Test commands for different user agents may be issued in series, in parallel or in a combination of series and parallel. In response to receiving test commands, user agents in the network execute the commands.

At block 203, the agent manager receives test results from the plurality of user agents. In some cases, one or more test commands depend on successful execution of one or more previous test commands. When there is a dependency between test commands, the agent manager will issue test commands synchronously (i.e., a second test command is issued when results from a first test command are received). If there is no dependency between test commands, the agent manager will issue test commands asynchronously (i.e., the second test command is issued immediately after the first test command without waiting for results of the first command). In addition, the agent manager may use test results from a user agent to vary the next test command issued to the user agent, allowing the agent manager to actively analyze faults. If there is a dependency between test commands and a failure is detected for one of the commands, the agent manager can obviate issuing subsequent dependent commands that result in more failures to reserve network resources.

At block 204, it is determined if one or more additional test commands are to be issued. For instance, a code in a test result may indicate a subsequent test command to be issued. A predefined script, conditional statements, and/or or set of rules can indicate test commands to be issued based on certain test results. As another example, tests results may reflect a problem in the network. An agent manager can decide (e.g., based on processing the test results, consulting heuristics, troubleshooting codes, etc.) to issue subsequent test commands in an attempt to gather more information about the problem. If one or more additional tests commands are to be issued, then control flows to block 209. If additional test commands are not to be issued, then control flows to block 207.

At block 207, it is determined if the problem can be identified based on the test results. An agent manager examines the test results for each user agent independently to identify failures, perhaps employing heuristics and/or using pre-defined conditionals. Then, the agent manager compares failures between test results for each user agent to identify patterns or similarities in the reported failures. A failure reported by one user agent may have more than one possible cause. By comparing the test results between user agents, the agent manager may be able to determine a specific cause for one or more reported failures. For example, an agent manager determines that a first user agent reported a failure after executing a register test command. Possible causes of the failure include a timeout, incorrect credentials were supplied by the first user agent, a registration server is down, etc. The agent manager examines test results from a second and third user agent and determines that both the second and third user agents reported register failures. By comparing the results of the three user agents, the agent manager is able to determine that the registration server is down. If the problem cannot be identified based on the test results, flow continues at block 211. If the problem can be identified based on the test results, flow continues at block 208.

At block 209, the agent manager issues a subsequent set of test commands to one or more user agents in the plurality of user agents in the network. The subsequent set of test commands may be issued to all of the user agents in the network or a subset of the user agents in the network. For example, a first and second user agent report failures in previous test results, but a third user agent reports that all tests passed. Test commands may not be issued to the third user agent. Flow returns to block 203.

If a problem could not be determined with the test results at block 207, then the agent manager sends the test results to a reporting application at block 211.

If a problem could be determined with the test results at block 207, then the agent manager analyzes the test results and indicates the problem(s) at block 208. For example, the agent manager can generate and transmit a pager notification or an e-mail notification to a system administrator depending upon severity of the problem The test results may comprise pass and fail information for each user agent for all test sessions along with determinations made by the agent manager as to the cause of the failures. Test results may also include other information such as timing information.

Figure 3:
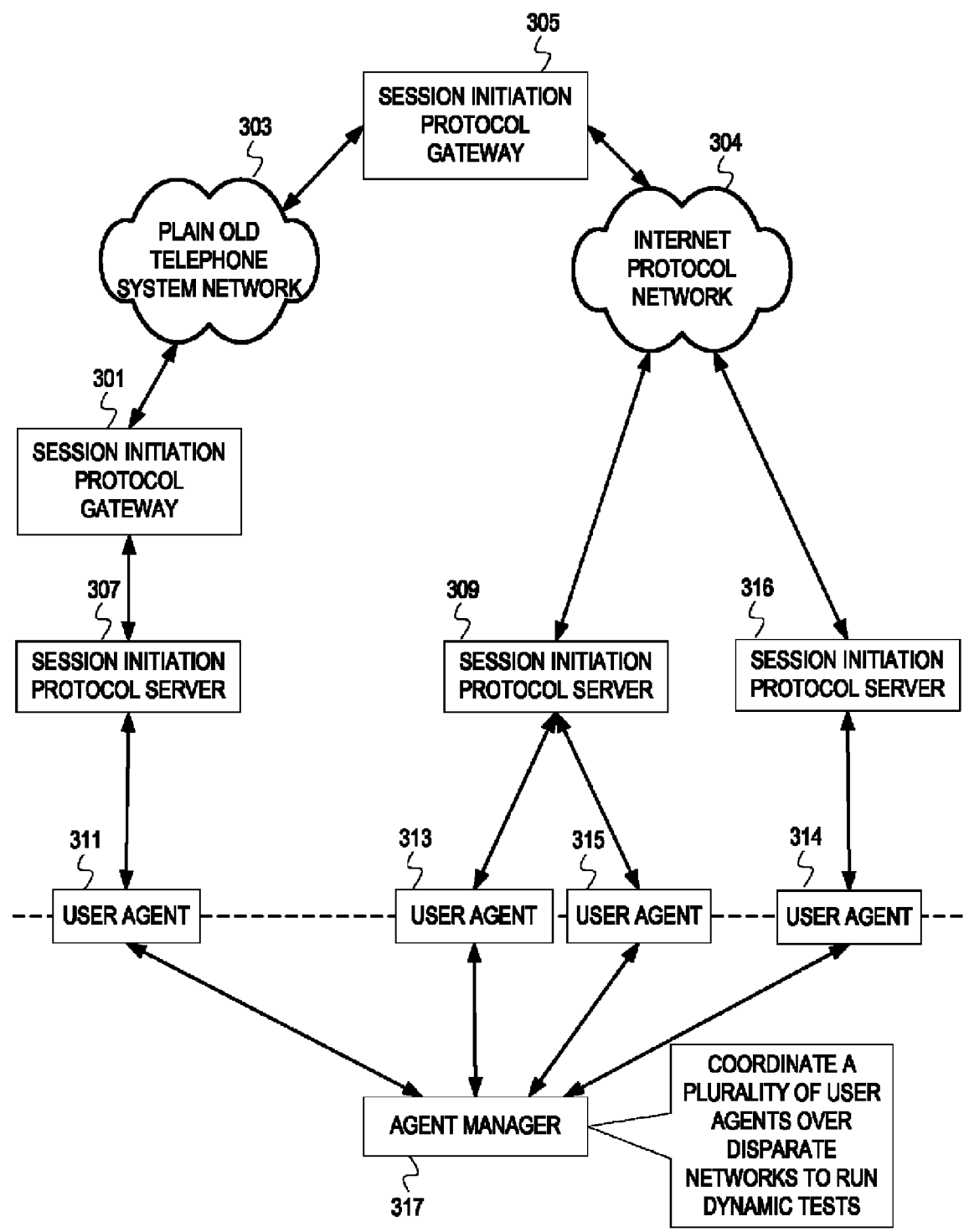
FIG. 3 depicts an example conceptual diagram of coordinating a plurality of user agents in a disparate network.

As discussed with respect to FIGS. 1 and 2, an agent manager issues test commands to plural user agents. The plural user agents can be spread across disparate networks. FIG. 3 depicts an example conceptual diagram of coordinating a plurality of user agents across disparate networks. In FIG. 3, a SIP gateway 305 is coupled between a plain old telephone system network 303 and an internet protocol network 304. A SIP gateway 301 is coupled between the POTS network 303 and a SIP server 307. The SIP server is coupled with a user agent 311. A SIP server 309 is coupled with the IP network 304 and user agents 313 and 315. A SIP server 316 is coupled with the IP network 304 and a user agent 314. An agent manager 317 is coupled with the user agents 311, 313, 315, and 314. The agent manager 317 coordinates the four user agents 311, 313, 314 and 315.

The diagram depicts three logically or geographically disparate network segments. The first network segment comprises the SIP gateway 301, the SIP server 307 and the user agent 311. The second network segment comprises SIP server 309 and user agents 313 and 315. The third network segment comprises the SIP server 316 and the user agent 314. An example of logically disparate networks is two distinct networks set up for two different work groups at the same company site. The two networks are independent, but allow communications and sharing of resources between the two networks. Geographically disparate networks exist in different geographical locations. The second and third network segments communicate with each other via the internet protocol network 304. The first network segment communicates with the second and third network segment via the SIP gateway 305. The connection between the SIP gateways 301 and 305 could also be a proxy, a virtual private network (VPN), etc.

To communicate with geographically or logically disparate user agents, the agent manager 317 may be connected to the user agents 311, 313, 314 and 315 by a proxy, VPN, etc. The agent manager 317 coordinates the user agents 311, 313, 314 and 315 in the disparate network segments to run dynamic tests for determining state of the network. The test results reported by each user agent 311, 313, 314 and 315 are analyzed to provide information about the network state and individual performance.

Figure 4:
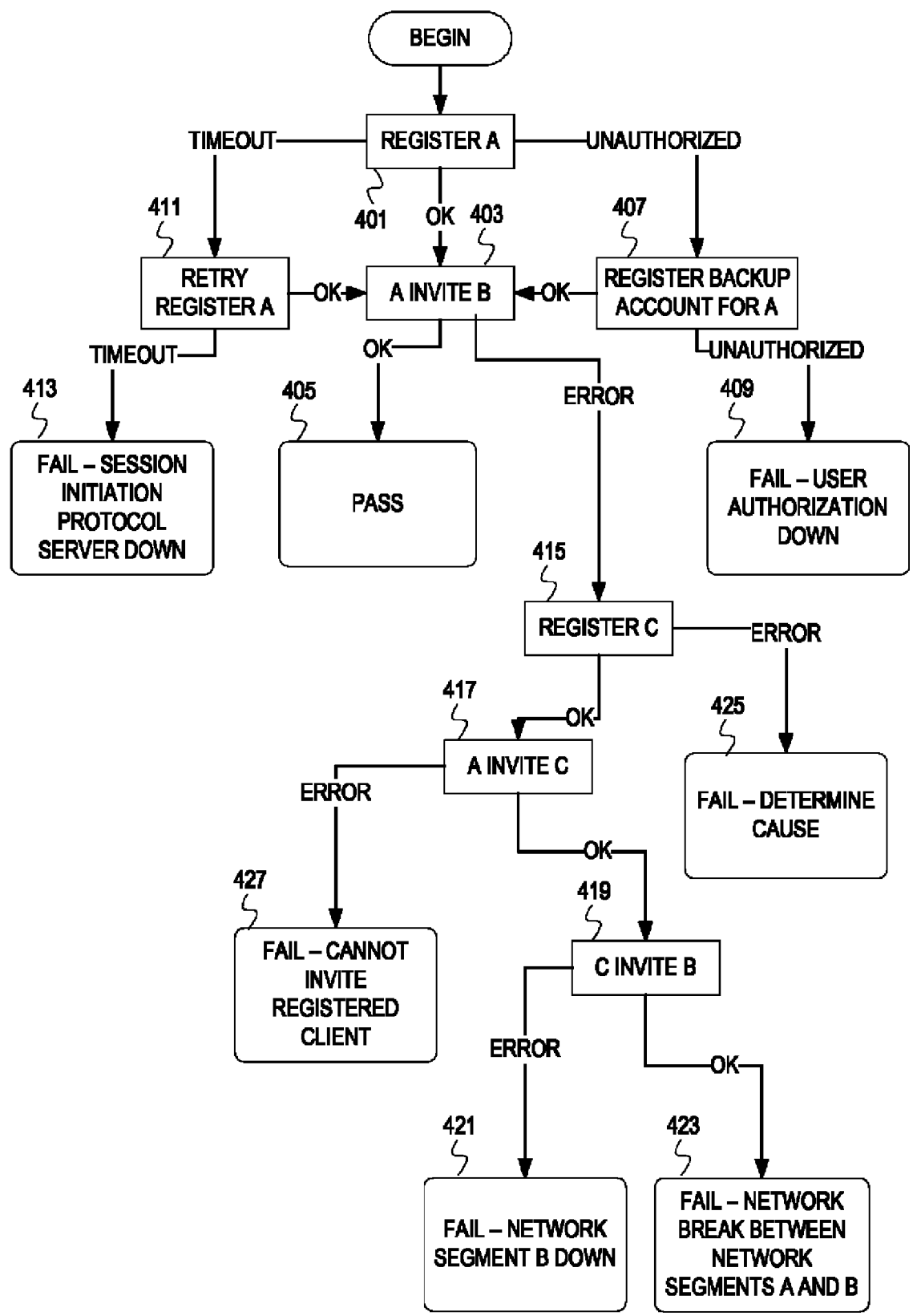
FIG. 4 depicts an example diagram of a dynamic network diagnostics with dynamic commands across multiple user agents.

FIG. 4 depicts a diagram of an example scenario of issuing test commands to user agents across disparate network segments for dynamic network testing. A network comprises three network segments that respectively include user agents A, B and C. Flow begins at block 401, where the user agent A executes test command "register A." If user agent A is registered successfully, flow continues at block 403. If a timeout error is received, flow continues at block 411. If an unauthorized error is received, flow continues at block 407.

At block 403, an agent manager receives test results from the test command "register A", and determines that the test passed. The agent manager issues another test command "A invite B" to user agent A. In response, the user agent A executes a test command "A invite B." If the test command "A invite B" is successful, flow continues at block 405. If the test command "A invite B" results in an error, flow continues at block 415.

At block 405, an agent manager receives test results from the test command "A invite B" and determines that the test command was performed successfully. User agent A was able to successfully establish a session with user agent B.

At block 407, the agent manager receives test results from the test command "register A" and determines that an unauthorized failure occurred. Based on the unauthorized failure, the agent manager determines that a second test should be run and issues a test command "register backup account for A." User agent A executes the test command "register backup account for A." If the test command "register backup account for A" is successful, flow continues at block 403. If execution of the test command "register backup account for A" results in an unauthorized error, flow continues at bock 409.

At block 409, the agent manager receives test results from the test command "register backup account for A" and determines that an unauthorized error occurred. The agent manager concludes that the cause of the failure is "user authorization down."

At block 411, the agent manager receives test results from the test command "register A" and determines that a timeout error occurred. The agent manager determines that a second test should be run and issues a test command "retry register A" to user agent A. In response, user agent A executes the test command "retry register A." If user agent A is registered successfully, flow continues at block 403. If a timeout error is received, flow continues at block 413.

At block 413, the agent manager receives test results from user agent A for executing the test command "retry register A," and determines that a timeout error occurred. With the test results, the agent manager concludes that the cause of the failure is "SIP server down."

At block 415, the agent manager receives test results from user agent A executing the test command "A invite B," and determines that an error occurred. The agent manager determines that the error has more than one possible cause, so the agent manager issues test command "register C" to user agent C. In response, user agent C executes test command "register C." If the user agent C is registered successfully, flow continues at block 417. If an error occurs, flow continues at block 425.

At block 417, the agent manager receives test results from the test command "register C" and determines that the test command was executed successfully. The agent manager issues another test command "A invite C" to the user agent A. In response, the user agent A executes the test command "A invite C." If the test command "A invite C" is performed successfully, flow continues at block 419. If the test command "A invite C" results in an error, flow continues at block 427.

At block 419, the agent manager receives test results from execution of the test command "A invite C" and determines that the test command was performed successfully. The agent manager issues another test command "C invite B" to the user agent C. In response, the user agent C executes the test command "C invite B." If the test command "C invite B" is performed successfully, flow continues at block 423. If the test command "C invite B" results in an error, flow continues at block 421.

At block 421, the agent manager receives test results from performance of the test command "C invite B" and determines that an error occurred. The agent manager concludes that the cause of the failure is "network segment B down."

At block 423, the agent manager receives test results from execution of the test command "C invite B" and determines that the test command was performed successfully. The agent manager concludes that the cause of the failure of the test command "A invite B" is "network break between network segments A and B."

At block 425, the agent manager receives test results from execution of the test command "register C" and determines that an error occurred. The agent manager issues more test commands to determine the cause of the failure. Flow for determining cause of the failure of test command "register C" is similar to blocks 411 and 407 for this depicted example.

At block 427, the agent manager receives test results from execution of the test command "A invite C" and determines that an error occurred. The agent manager concludes that the cause of the failures of the test commands "A invite B" and "A invite C" is "cannot invite registered client."

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, referring to FIG. 2, the operations for issuing a first set of test commands and receiving test results may occur in parallel. In addition, some test commands may not be issued until results are received from previous test commands. Moreover, embodiments are not limited to diagnosing problems in a network. An agent manager can utilize network protocol commands to measure performance of a network, and take subsequent actions. For instance, the agent manager can issue network protocol commands to user agents, execution of which provide the agent manager with response times. The agent manager can then use the response time information to adjust time out periods, provide the information to another system, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing ("machine readable storage medium") or transmitting ("machine readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, machine readable signal medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
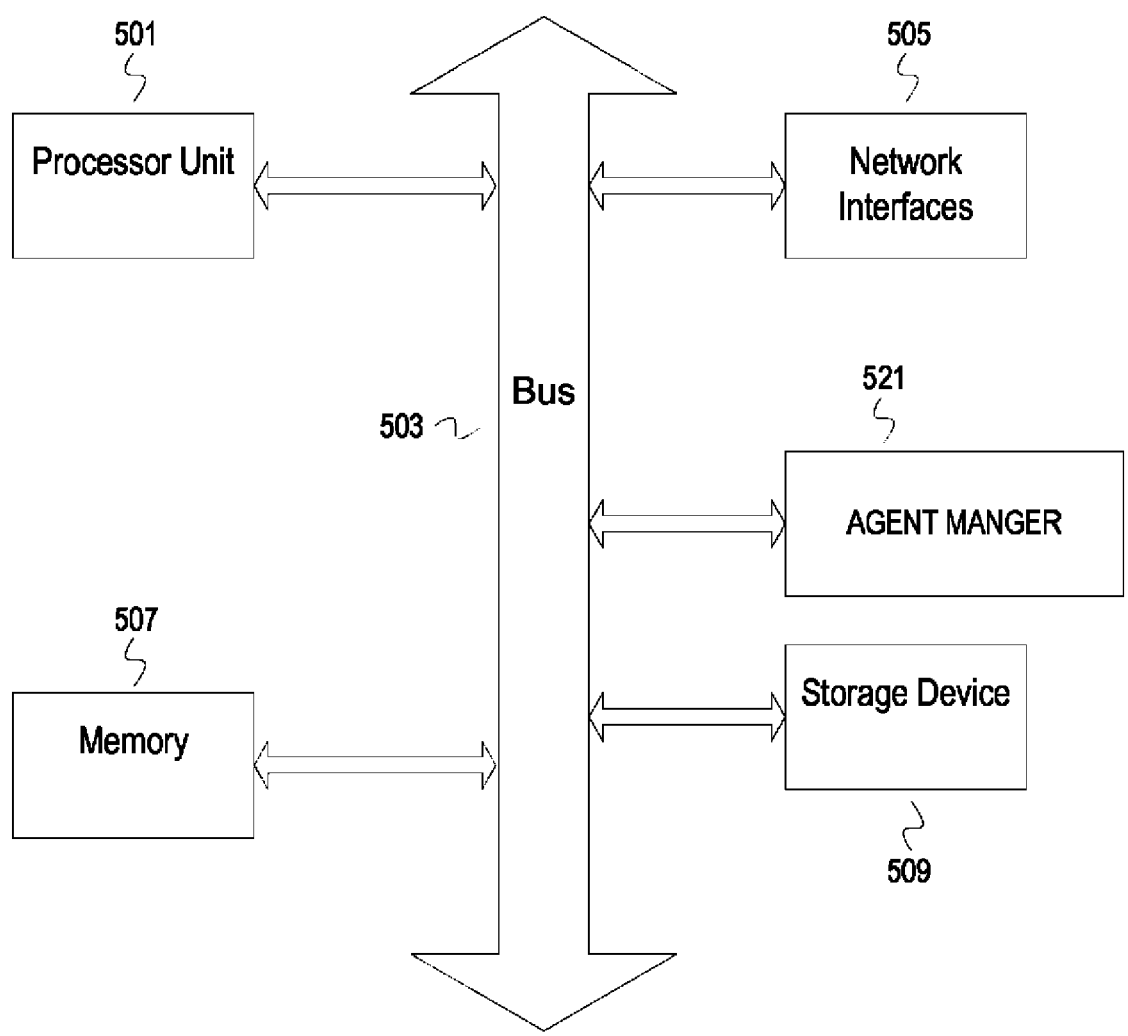
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also includes an agent manager 521 that coordinates session initiation protocol user agents to run dynamic network tests. Any one of the functionalities for coordinating dynamic network tests across user agents may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for dynamic testing of session initiation protocol networks as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer implemented method comprising:
an agent manager transmitting a first set of one or more network commands to a plurality of user agents across a network to test the network, wherein the plurality of user agents execute respective ones of the first set of network commands to generate a first set of results, the first set of results including results from at least two of the plurality of user agents;
analyzing the first set of results received from the plurality of user agents;
automatically determining by the agent manager a second set of one or more commands to be issued to the plurality of user agents based at least in part on the results from at least two of the plurality of user agents;
transmitting the second set of commands to at least one of the plurality of user agents, wherein the at least one of the plurality user agents executes respective ones of the second set of commands to generate a second set of results;
diagnosing a problem in the network based on the first and the second set of results; and
storing an indication of the diagnosed problem in a machine-readable medium;

wherein the problem is diagnosed as a network segment failure in response to a first user agent on a first network segment successfully communicating with a second user agent on a second network segment and wherein the first user agent and the second user agent fail to communicate with a third user agent on a third network segment.

2. The method of claim 1, wherein the plurality of user agents are located in geographically or logically disparate network segments.

3. The method of claim 1, wherein at least one of the second set of one or more commands depends on at least one of the first set of one or more commands.

4. The method of claim 1, wherein said analyzing the first set of results received from the plurality of user agents comprises one or more of examining time out values, comparing response times to thresholds, and identifying failures.

5. The method of claim 4, wherein said analyzing the first set of results received from the plurality of user agents further comprises one or more of consulting heuristics and identifying patterns and similarities in the first set of test results.

6. The method of claim 1, wherein the first and the second sets of commands comply with the session initiation protocol.

7. The method of claim 6 further comprising sending the first and the second results to a reporting application.

8. The method of claim 1, wherein analyzing the first set of results received from the plurality of user agents includes comparing results received from at least two of the user agents and wherein diagnosing the problem in the network based on the first and the second set of results includes diagnosing the problem in accordance with the comparison of the results received from at least two of the user agents.

9. A computer program product for dynamically testing one or more networks, the computer program product comprising:
a machine readable storage medium having computer usable program code stored thereon, the computer usable program code configured to:
transmit a first set of one or more network commands to a plurality of user agents across a network to test the network, wherein the plurality of user agents execute respective ones of the first set of network commands to generate a first set of results, the first set of results including results from at least two of the plurality of user agents;
analyze the first set of results received from the plurality of user agents;
automatically determine a second set of one or more commands to be issued to the plurality of user agents based at least in part on the results from at least two of the plurality of user agents;
transmit the second set of commands to at least one of the plurality of user agents, wherein the at least one of the plurality user agents executes respective ones of the second set of commands to generate a second set of results; and
diagnose a problem in the network based on the first and the second set of results; wherein the problem is diagnosed as a network segment failure in response to a first user agent of the plurality of user agents on a first network segment successfully communicating with a second user agent of the plurality of user agents on a second network segment and wherein the first user agent and the second user agent fail to communicate with a third user agent on a third network segment.

10. The computer program product of claim 9, wherein the plurality of user agents are located in geographically or logically disparate network segments.

11. The computer program product of claim 9, wherein at least one of the second set of one or more commands depends on at least one of the first set of one or more commands.

12. The computer program product of claim 9, wherein said computer usable program code being configured to analyze the first set of results received from the plurality of user agents comprises the computer usable code being configured to perform one or more of examine time out values, compare response times to thresholds, and identify failures.

13. The computer program product of claim 12, wherein said computer usable program code being configured to analyze the first set of results received from the plurality of user agents comprises the computer usable code being configured to perform one or more of consult heuristics, and identify patterns and similarities in the first set of test results.

14. The computer program product of claim 9, wherein the first and the second sets of commands comply with the session initiation protocol.

15. The computer program product of claim 14, wherein said computer usable program code is further configured to send the first and the second results to a reporting application.

16. The computer program product of claim 9, wherein the computer usable program code configured to analyze the first set of results received from the plurality of user agents includes computer usable program code configured to compare results received from at least two of the user agents and wherein the computer usable program code configured to diagnose the problem includes computer usable program code configured to diagnose the problem in accordance with the comparison of the results received from at least two of the user agents.

17. The computer program product of claim 9, wherein the problem comprises a network connectivity problem and wherein the computer usable program code configured to diagnose the problem includes computer usable program code configured to diagnose a network segment failure in response to a first user agent on a first network segment successfully communicating with a second user agent on a second network segment and wherein the first user agent and the second user agent fail to communicate with a third user agent on a third network segment and to diagnose a network break between the first network segment and the third network segment in response to a first user agent failing to communicate with the third user agent and the second user agent successfully communicating with the third user agent.

18. An apparatus comprising:
a set of one or more hardware processor units;
a network interface; and
an agent manager configured to:
transmit a first set of one or more network commands to a plurality of user agents across a network to test the network, wherein the plurality of user agents execute respective ones of the first set of network commands to generate a first set of results, the first set of results including results from at least two of the plurality of user agents;
analyze the first set of results of the plurality of user agents executing the plurality of network commands, wherein the plurality of user agents transmit the first set of results to the agent manager;
automatically determine a second set of one or more commands to be issued to the plurality of user agents based at least in part on the results from at least two of the plurality of user agents;
transmit the second set of commands to at least one of the plurality of user agents, wherein the at least one of the plurality user agents executes respective ones of the second set of commands to generate a second set of results;

determine a state of the network based, at least in part, on the first set of results and the second set of results transmitted from the user agents; and supply at least one of the first set of results, the second set of results or the determined state to a reporting application;

wherein the state of the network is determined to include as a network segment failure in response to a first user agent on a first network segment successfully communicating with a second user agent on a second network segment and wherein the first user agent and the second user agent fail to communicate with a third user agent on a third network segment.

19. The apparatus of claim 18, wherein the agent manager comprises one or more machine-readable media.

20. The apparatus of claim 18, wherein the agent manager is further configured to compare results received from at least two of the user agents and to diagnose the problem in accordance with the comparison of the results received from at least two of the user agents.

* * * * *